Nov. 14, 1939.  W. RAWNSLEY  2,179,955
TRAILER HITCH
Filed Oct. 4, 1937
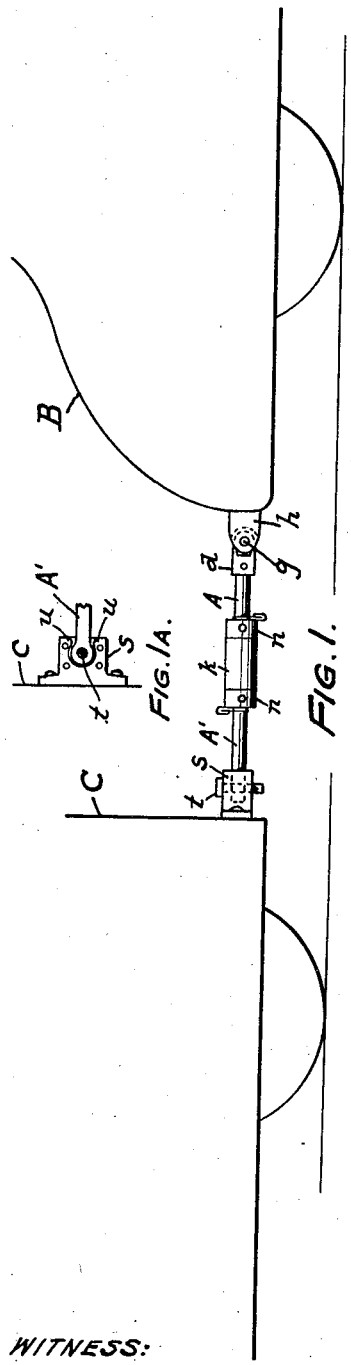
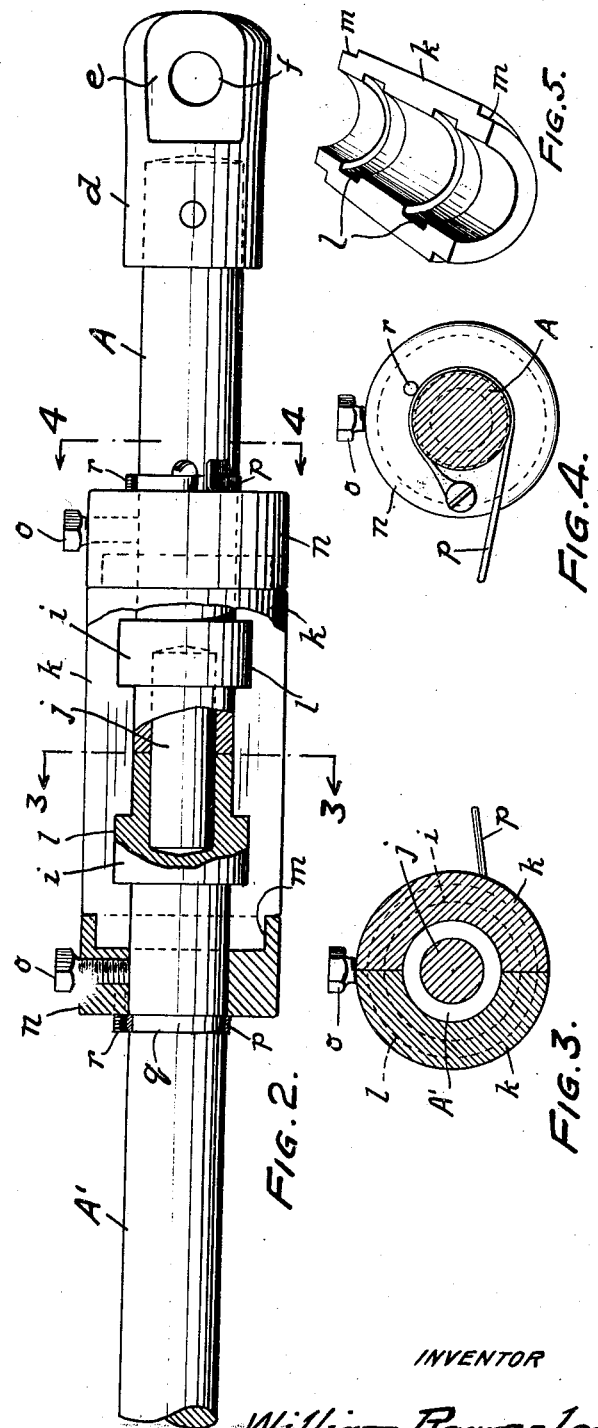
INVENTOR
William Rawnsley
BY
Busser + Harding
ATTORNEYS.
WITNESS:
Rob R Kitchel Patented Nov. 14, 1939

2,179,955

UNITED STATES PATENT OFFICE 2,179,955

TRAILER HITCH

William Rawnsley, Avalon, N. J.

Application October 4, 1937, Serial No. 167,090

6 Claims. (Cl. 280—33.44)

This invention relates to a trailer hitch and more particularly to that element of a hitch by which the members secured to a trailer and tow car are connected.

Heretofore numerous devices have been provided for securing a trailer to a towing car, but variously have been found unsatisfactory in that variously they are ineffective to keep the trailer in alignment with the towing car, are of undue complication and hence expensive and difficult to connect and disconnect, or in that they are unduly heavy to avoid breakage under strains to which they are subjected in movements of a trailer and its towing car over irregular road surfaces.

Now in accordance with this invention there is provided a hitch so constructed as to insure alignment of a trailer with its tow car and, at the same time, one simple and inexpensive in construction, which may be readily connected and disconnected and which will absorb the strains incident to the movement of a trailer and its towing car over irregular road surfaces.

Generally speaking, the hitch in accordance with this invention will comprise a member adapted to be secured at one of its ends rigidly to the forward end of a trailer, a second member adapted to be secured at one of its ends on a horizontal pivot to the rear end of a towing car and a coupling so designed as to secure said members together in alignment and at the same time so as to permit the members to turn relatively to one another.

Having now indicated in a general way the nature and purpose of this invention, I will proceed to a detailed description thereof with reference to the accompanying drawing by which I have illustrated a preferred embodiment and in which:

Figure 1 is a diagrammatic view showing a trailer and a towing car connected by a hitch in accordance with this invention.

Figure 1A is a plan view showing a detail of construction.

Figure 2 is a side view, partly in section, of a trailer hitch according to this invention.

Figure 3 is a sectional view on line 3—3, Figure 2, looking in the direction of the arrows.

Figure 4 is a sectional view on line 4—4, Figure 2, looking in the direction of the arrows.

Figure 5 is a perspective view showing the construction of an element of the hitch shown in Figure 2.

Referring to the several figures, A indicates a draft member, circular in cross section, adapted to be connected to a towing car B, while A' indicates a draft member, circular in cross section, and adapted to be connected to a trailer C.

The member A is adapted to be connected to a towing car on a horizontal pivot and for such purpose a member $d$, having opposite flat faces $e$ and drilled as at $f$, is formed on an end of the member A, or, as shown, the member $d$ may be formed separately and secured to the member A. The member $d$ is adapted to be secured by a horizontal pin $g$ in a clevis $h$ secured to the rear of the towing car B. The member A' may be rigidly secured to the forward end of a trailer, as, for example, to the forward end of the frame of a two-wheeled trailer, or to the steering rod of a four wheeled trailer. Again, as shown in Figure 1A, member A' may be secured by a vertical pin $t$ to a fitting $s$, secured to the forward end of a trailer and having side flanges $u$ to limit the angular movement of the member A'.

Adjacent to the free ends of each of the members A and A' are annular flanges or rings $i$, which may be formed by turning down the members, and the free ends of the members are bored out axially for the reception of a loose pin $j$ when the ends of the members are brought together.

A pair of half round clamping members $k$, $k$, provided with annular recesses $l$, $l$, for the reception of the annular flanges $i$, $i$ are adapted to embrace and bridge over the meeting ends of the members A, A'. The end portions $m$, $m$ of the members $k$, $k$ are reduced in diameter for the reception of collars $n$, $n$, which are carried on the members A, A' and which are adapted to embrace the end portions of the members $k$, $k$, and retain them in assembled position, as shown in Figure 2.

The collars $n$, $n$ are secured against axial movement by means of set bolts $o$, $o$ and desirably also by flat springs $p$, $p$, secured at one end to the rear faces of the collars and extending circumferentially thereof, adapted to engage under tension in annular grooves $q$, formed in the members A and A', respectively. Retaining pins $r$, $r$, carried by the collars $n$, $n$ serve to retain the springs and facilitate their removal from the grooves when pressure is applied to their free ends.

As will now, it is believed, be clear a trailer and a towing car may be readily connected by means of the hitch described, it being only necessary to bring the ends of the members A and A', secured to a trailer and a towing car, together, with the pin j in place in the end of one of the members, apply the members k, k and lock them by means of the collars n, n.

The pin j will act to align the members A, A' for convenient application of the members k, k by which, when they are locked by the collars n, n, the members A, A' will be secured together.

In towing the members k, k and the pin j will maintain the members A, A' in alignment and the members k, k engaged within the flanges i, i on the members A, A' will take the draft. Since the member A is secured to the towing car on the horizontal pivot g, relative vertical movement between the towing car and trailer is permitted and since the connection between members A, A' is through the engagement of the annular flanges i, i in the annular recesses l, l in members k, k, the members A, A' may turn relatively to one another without strain where either the trailer or towing car is raised on one side or tipped with respect to the other.

It will now be appreciated that in accordance with this invention a hitch is provided which will insure alignment of a trailer with a towing car and which accommodates itself to various relative movement of the trailer and towing car without subjection to strain other than that of the draft.

It will be appreciated that various modifications in the structure above described by way of illustration may be made without departing from the scope of this invention as defined by the claims appended hereto.

What I claim and desire to protect by Letters Patent is:

1. A trailer hitch comprising a pair of draft members adapted to be secured respectively at one end to a trailer and a towing car and means for releasably securing the free ends of said draft members together, said means comprising annular flanges adjacent the free ends of said members, a pin entered in axial bores extending from the free ends of said draft members, a pair of half round members provided with annular recesses complementary to said flanges together embracing and bridging the free ends of said draft members and engaging said flanges, and collars on said draft members embracing the ends of said half round members and secured to said draft members against axial movement with respect thereto.

2. A trailer hitch comprising a pair of draft members adapted to be secured respectively at one end to a trailer and a towing car and means for releasably securing the free ends of said draft members together, said means comprising annular flanges adjacent the free ends of said members, a pair of half round members provided with annular recesses complementary to said flanges together embracing and bridging the free ends of said draft members and engaging said flanges, collars on said draft members embracing the ends of said half round members and springs secured to said collars and engaging said draft members to prevent axial movement thereof.

3. A trailer hitch comprising a draft member adapted to be secured to a trailer, a draft member adapted to be secured to a towing car and means for connecting adjacent ends of said draft members, said means including a pin extending axially within said draft members from their adjacent ends and freely movable both longitudinally and rotatably within said draft members and means engaging the adjacent ends of said draft members and securing them together while permitting rotation of the members with respect to each other.

4. A trailer hitch comprising a draft member secured to a trailer on a vertical pivot only, means for restricting movement of said draft member on said vertical pivot, a draft member secured to a towing machine on a horizontal pivot only and means for connecting said draft members, said means including a pin extending axially within said draft members from their adjacent ends and freely movable both longitudinally and rotatably within said draft members and means engaging the adjacent ends of said draft members and securing them together while permitting rotation of the members with respect to each other.

5. A trailer hitch comprising a draft member secured to a trailer on a vertical pivot, means for restricting movement of said draft member on said vertical pivot, a draft member secured to a towing machine on a horizontal pivot and means for connecting said draft members, said means including a pin extending axially within the ends of the draft members and means embracing and bridging the ends of the draft members and permitting rotation of the members with respect to each other.

6. A trailer hitch comprising a pair of draft members adapted to be secured respectively at one end to a trailer and a towing car and means for releasably securing the free ends of said draft members together, said means comprising annular flanges adjacent the free ends of said members, a pin entered in axial bores extending from the free ends of said draft members, a pair of half round members provided with annular recesses complementary to said flanges together embracing and bridging the free ends of said draft members and engaging said flanges and means for securing said half round members together.

WILLIAM RAWNSLEY.